United States Patent [19]
Watanabe et al.

[11] Patent Number: 6,047,015
[45] Date of Patent: Apr. 4, 2000

[54] MOBILE RADIO APPARATUS

[75] Inventors: Masatoshi Watanabe, Kawasaki; Kazuyuki Miya, Machida; Osamu Kato, Yokohama, all of Japan

[73] Assignee: Matsushita Electric Industrial Co., Ltd., Osaka, Japan

[21] Appl. No.: 08/546,554

[22] Filed: Oct. 20, 1995

[51] Int. Cl.[7] .............................. A61F 2/06; H04L 27/30
[52] U.S. Cl. ........................................... 375/132; 375/133
[58] Field of Search ................................... 375/200, 201, 375/202, 205, 206, 259, 130, 132, 133, 135, 136; 370/441; 455/54.1, 39, 53.1

[56] References Cited

U.S. PATENT DOCUMENTS

| | | | |
|---|---|---|---|
| 5,222,098 | 6/1993 | Yamamoto et al. | 375/201 |
| 5,375,140 | 12/1994 | Bustamante et al. | 375/200 |
| 5,499,236 | 3/1996 | Giallorenzi et al. | 370/441 |
| 5,539,728 | 7/1996 | Gaiani et al. | 375/201 |

FOREIGN PATENT DOCUMENTS 4-502841  5/1992  Japan .

OTHER PUBLICATIONS

Shigeru Tomasato et al, "Coherent Hybrid DS–FFH CDMA Basic Performance in Mobile Radio Environment", Technical Report of IEICE, RCS92–103, 1993–01;, pp. 61–66.
R. Esmailzadeh et al, "Power Control in Packets Switched Time Division Duplex Sequence Spread Spectrum Communications", VTC'92, pp. 989–992.
Wu et al., Capacity of Synchronous Coded DS– SFH– and FFH– SSMA for Wireless Local Communications, May 1994.

*Primary Examiner*—Chi H. Pham
*Assistant Examiner*—Bryan Webster
*Attorney, Agent, or Firm*—Venable; Robert J. Frank; Allen Wood

[57] ABSTRACT

A mobile radio apparatus includes a base station and a mobile station which communicate with each other by a hybrid code division multiple access scheme. The base station selects a hopping pattern in a frequency hopping method so as to completely avoid overlapping of a carrier for a forward link signal with a carrier for a reverse link signal at the same time, and transmits the forward link signal in a predetermined frequency band. The mobile station similarly transmits the reverse link signal. The mobile station has a multiplier for multiplying the forward link signal by a carrier at the same frequency as the carrier for the forward link signal to derive a received signal, a communication channel correlator for detecting a correlation of the received signal to separate a communication channel signal, a received power level detector circuit for detecting a received power level of the communication channel signal, and a transmission power level control signal for controlling a transmission power level of the reverse link signal, when transmitted to the base station, based on the received power level of the communication channel signal, using a carrier at the same frequency as the carrier for the forward link signal when the received power level of the communication channel signal is detected.

29 Claims, 11 Drawing Sheets

FIG.2
PRIOR ART
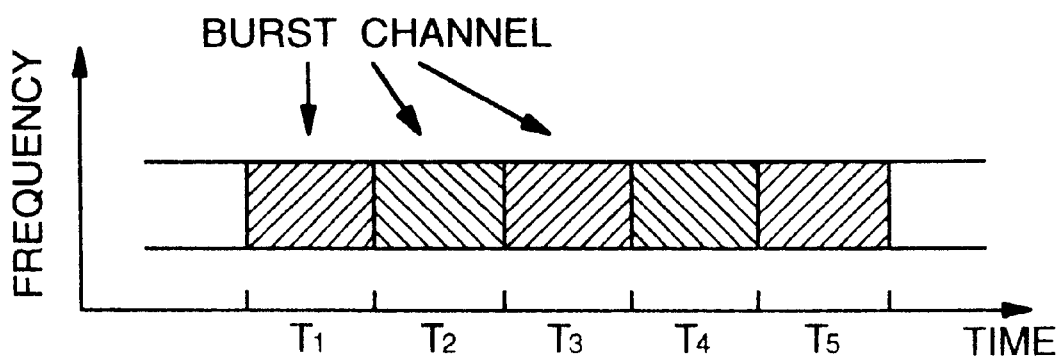
FORWARD LINK (BASE STATION→
                        MOBILE STATION)
REVERSE LINK (MOBILE STATION→
                        BASE STATION)

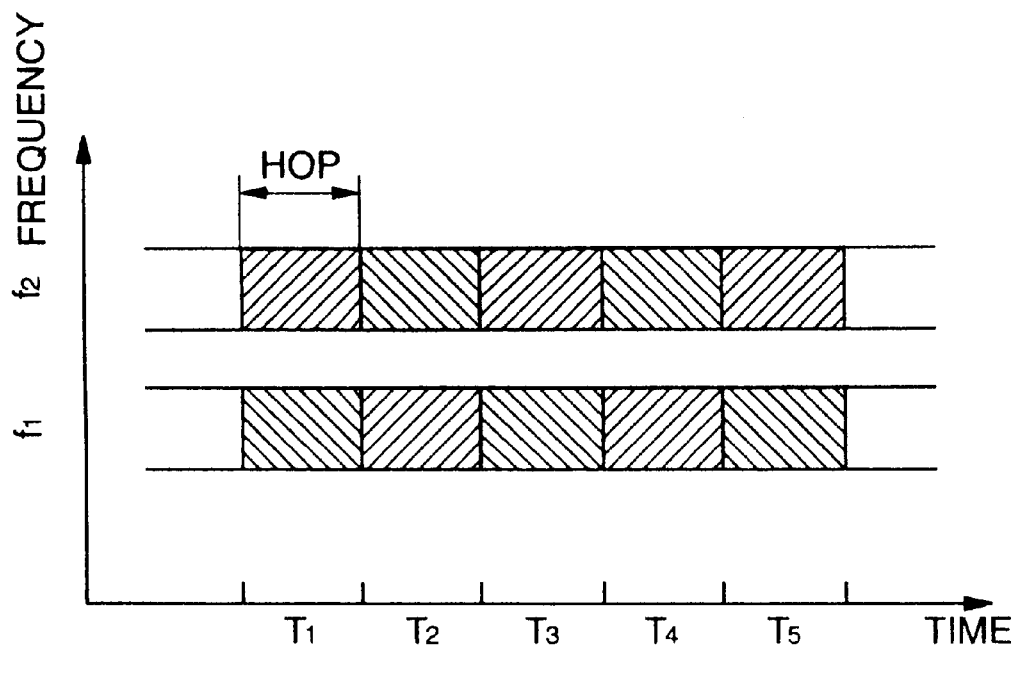

MOBILE RADIO APPARATUS

BACKGROUND OF THE INVENTION

1. Field of the Invention

The present invention relates to a mobile radio apparatus which is suitable for use in radio communications performed by digital automobile telephones, portable telephones and so on.

2. Description of the Related Art

The code division multiple access (CDMA) scheme is one of the multiple access techniques which allows a plurality of stations to simultaneously communicate in the same frequency band in radio communications. While other techniques are also known, e.g., the frequency division multiple access (FDMA) scheme and time division multiple access (TDMA) scheme, the CDMA scheme is advantageous over these techniques in that the frequency band is highly efficiently utilized and more users may be accommodated.

The CDMA scheme performs the multiple access by spread spectrum communications which spread the spectrum of information signals to a sufficiently wide band compared with an original information bandwidth for transmission. The direct sequence method is a method which multiplexes a spreading code on an information signal as it is. The frequency hopping method is a method which discretely switches the frequency of a carrier signal modulated by information within a given frequency band. The hybrid CDMA scheme is a type of CDMA scheme which is a combination of the direct sequence method and the frequency hopping method, as described in an article "Coherent Hybrid DS-FFH.CDMA, Basic Performance in Mobile Radio Environment" by Shigeru Tomisato, Kazuhiko Hukawa, and Hiroshi Suzuki (Technical Report of IEICE, RCS92-109, pp. 61–66, January 1993).

A CDMA scheme employing the direct spreading method implies a near-far problem which may occur when a desired transmission station is located far from a receiver and an unwanted transmission station (interfering station) is located near the receiver, so that a received signal from the unwanted transmission station has a received power larger than a received signal from the desired transmission station, whereby the processing gain (spreading gain) is insufficient to suppress the cross-correlation between spreading codes, resulting in disabled communications. For this reason, control of the transmission power in accordance with the state of each transmission channel is essential in the reverse link from a mobile station to a base station for a cellular system employing the direct spreading CDMA scheme.

Also, as a measure to combat fading, which is the cause of a deterioration in link quality in the land mobile communications, a method has been proposed for compensating for changes in the instantaneous value of the received power by controlling the transmission power.

JP-A-4-502841 shows an example of a transmission power control configuration for a cellular system employing a direct spreading CDMA scheme. FIGS. 1A, 1B illustrate the configuration described in JP-A4-502841. In FIG. 1A, a base station generally denoted by 41 includes data to be transmitted 42; a baseband processing circuit 43; a modulator 44; an adder 45; an antenna 46; an analog receiver 47; a digital receiver 48; a received level detector circuit 49; and received data 50. In FIG. 1B, a mobile station generally denoted by 51 includes an antenna 52; an analog receiver 53; a digital receiver 54; a baseband processing circuit 55; received data 56; data to be transmitted 57; a modulator 58; a control processor 59; and a transmission level control circuit 60.

In the above-mentioned configuration, a forward link from the base station 41 to the mobile station 51 uses a different frequency band from that of a reverse link from the mobile station 51 to the base station 41. This method is called a frequency division duplex (FDD) scheme which is advantageous in that a transmitter and a receiver can be operated simultaneously, the transmitter does not interfere with the receiver, and so on.

Since the FDD scheme uses different frequency bands for the reverse link and the forward link, the reverse link and the forward link exhibit different changes in instantaneous value of a received electric field level due to fading, although they present substantially the same slow changes in central value of the received electric field level. Therefore, the transmission power control method first detects the total power level received at the mobile station 51 in the digital receiver 54, and uses the detected total received power level to control the transmission power level by the transmission level control circuit 60, thereby compensating for changes in the central value of an electric field level to be received by the base station 41. This method is referred to as a method of controlling transmission power using a loop. Further, since an open loop alone cannot provide compensation for changes in the instantaneous value of the received electric field level, the base station 41 has the received level detector circuit 49 detect the power level of the received signal from the mobile station 51 after the received signal has been demultiplexed. The detected power level permits the base station 41 to know a link state in the frequency band of the reverse link. Then, the base station 41 transmits reverse link state information to the mobile station 51 through the forward link. The mobile station 51 controls the transmission power using the reverse link state information to compensate for changes in the instantaneous value of the received electric field level due to fading. This method is referred to as a method of controlling transmission power using a closed loop.

As described above, the CDMA scheme using FDD realizes transmission power control by a combination of an open loop and a closed loop.

An article "Power Control in Packets Switched Time Division Duplex Sequence Spread Spectrum Communications" by R. Esmailzadeh, M. Nakagawa, and A. Kajiwara (proc. of VTC' 92, pp. 989–992, 1992) discloses a method of controlling transmission power in a CDMA/TDD scheme. TDD (Time Division Duplex) means that the same band is used for both transmission and reception, and is also referred to as a ping-pong scheme. More specifically, the TDD is a scheme which time divides the same radio frequency band for transmission and reception to achieve bi-directional communications through the same frequency band. FIG. 2 graphically represents a concept of the TDD scheme. It can be seen that at time $T_1$ the base station starts transmission while the mobile station starts reception, and at time $T_2$ the mobile station is switched to transmission while the base station to reception. These operations are repeated to realize bi-directional communications through a single frequency band.

The transmission power control in the CDMA/TDD scheme is performed only with an open loop. A control system for the CDMA/TDD scheme is described below with reference to FIGS. 3A, 3B. In FIG. 3A, a base station generally denoted by 61 includes data to be transmitted 62; a modulator 63; a spreader 64; a switch 65; an antenna 66; a correlator 67; a demodulator 68; and received data 69. In FIG. 3B, a mobile station generally denoted by 71 includes an antenna 72; a switch 73; a correlator 74; a demodulator 75; received data 76; data to be transmitted 77; a modulator 78; a received level detector circuit 79; a transmission level control circuit 80; and a spreader 81.

In the above-mentioned configuration, at a timing such as time T1 in FIG. 2, at which the base station 61 starts transmission while the mobile station 71 starts reception, the switch 65 in the base station 61 connects the spreader 64 to the antenna 66, while the switch 73 in the mobile station 71 connects the correlator 74 to the antenna 72. In the base station 61 thus connected, the data to be transmitted 62 is modulated in the modulator 63, spread in the spreader 64, and transmitted from the antenna 66. In the mobile station 71, in turn, the signal transmitted from the base station 61 through a transmission channel is received by the antenna 72, subjected to detection of a correlation in the correlator 74, and demodulated to received data in the demodulator 75. The output of the correlator 74 is inputted to the received level detector circuit 79, which detects therefrom the received power on the communication channel directed to the mobile station 71. Next, at time $T_2$ in FIG. 2, at which the mobile station is switched 71 is switched to transmission while the base station to reception, the switch 73 in the mobile station 71 connects the spreader 81 to the antenna 71, while the switch 65 in the base station 61 connects the correlator 67 to the antenna 66. In the mobile station 71, data to be transmitted 77 is modulated in the modulator 75, and transmission power is determined in the transmission level control circuit 80 using the output of the received level detector circuit 79 generated at time $T_1$ such that the power level to be received at the base station 61 remains constant irrespective of fading and so on. A signal to be transmitted, after being outputted from the transmission level control circuit 80, is spread in the spreader 81, and transmitted from the antenna 72. The base station 61, in turn, receives multiplexed signals from a plurality of mobile stations 71 through transmission channels by the antenna 66, separates the signal from the particular mobile station 71 by the correlation detection, and demodulates the separated signal in the demodulator 68 to derive received data 69.

As described above, since the CDMA/TDD scheme uses the same frequency band for the reverse link and the forward link, these links present the same change in distance of a radio link and the same change in instantaneous value of the received electric field level due to fading. Therefore, the open loop transmission power control is only required to compensate for a slow change with respect to the period of TDD.

However, in the transmission power control for the CDMA/IDD scheme, since different frequency bands are used for the reverse link and the forward link, although these links present substantially the same slow changes in central value of the received electric field level, changes in the instantaneous value of the received electric field level due to fading are not the same, so that a closed loop configuration is required for the transmission power control. For such a closed loop control, the base station must be provided with a means for detecting the received levels of all associated mobile stations in order to reveal the link state for the reverse link and a means for informing the associated mobile stations of the state information, thus resulting in a complicated system. Also, for the mobile stations to know the link state, a delay occurs due to the processing for detecting the received levels of mobile stations in the base station, the propagation time required to send the state information to the mobile stations, and so on. It is therefore impossible to compensate for a change faster than the delay time.

Further, in the transmission power control for the CDMA/TDD scheme, since the same frequency band is used for the reverse link and the forward link, the mobile station can know the link state only with a received signal from the base station, and therefore a closed loop configuration is only required for the transmission power control. However, during a state in which the mobile station is dedicated to transmission and the base station to reception, the mobile station cannot know the link state during this state since it is the transmitting party. Even if a sudden change occurs in received power due to shadowing of a building or the like during this state, the mobile station cannot follow such a change. Particularly, if the received power suddenly becomes extremely large, this change will adversely affect the entire system. Also, since each mobile station detects the received power level of a signal on a communication channel directed thereto after the correlation detection, an auto-correlation value and a cross- correlation value differ from one mobile station to another due to different spreading codes and different communication channel data between the respective mobile stations. As a result, the respective mobile stations present different accuracies in the detection of the received power level. Further, when the base station also controls the transmission power, the base station cannot exactly know the link states at the respective mobile stations since the transmission level of the base station changes.

SUMMARY OF THE INVENTION

The present invention has been made to solve problems as mentioned above inherent in the prior art systems, and it is an object of the present invention to provide a mobile radio apparatus which is capable of carrying out high speed and accurate transmission power control.

To achieve the above object, the present invention provides a mobile radio apparatus employing, as a multiple access scheme, a hybrid CDMA scheme which is a combination of direct spreading and frequency hopping, wherein a hopping pattern is selected so as to avoid overlapping of a forward link signal directed from a base station to a mobile station and a reverse link signal directed from the mobile station to the base station at the same time, so that the forward link signal and the reverse link signal are multiplexed in the same frequency band.

Further, in the forward link, a pilot channel common to all mobile stations is set in addition to a communication channel for performing communications.

Thus, according to the present invention, the same frequency band can be used for the reverse link and the forward link, so that the mobile station immediately reveals a radio link situation from the power level of a received signal from the base station to perform high speed transmission power control in the unit of a hop (the duration of the same frequency).

Also, the use of the pilot channel signal permits the mobile station to know the radio link state independently of changes in the transmission power of a signal from the base station on a communication channel, so that further accurate control can be achieved for the transmission power by avoiding different accuracies presented by the respective mobile stations in the detection of the received power level due to different spreading codes and different communication channel data employed by the respective mobile stations.

BRIEF DESCRIPTION OF THE DRAWINGS

FIG. 2 is a diagram conceptually representing a channel allocation in a TDD scheme;

FIG. 6 is a diagram conceptually representing a channel allocation in the first embodiment of the mobile radio apparatus according to the present invention;

DESCRIPTION OF THE PREFERRED EMBODIMENTS

Figure 1A:
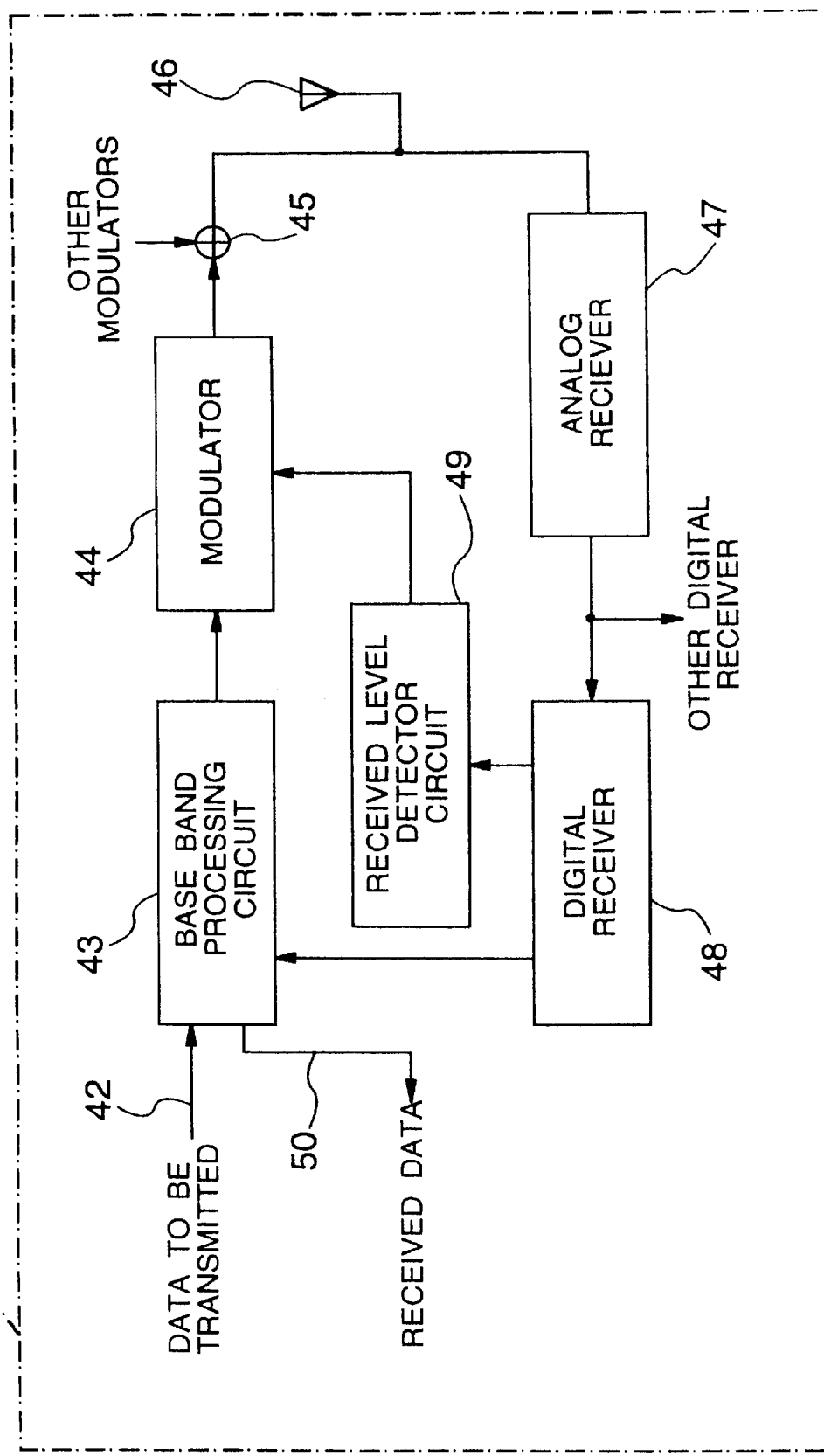
FIGS. 1A, 1B are block diagrams showing a prior art mobile radio apparatus employing a FDD scheme.
Figure 1B:
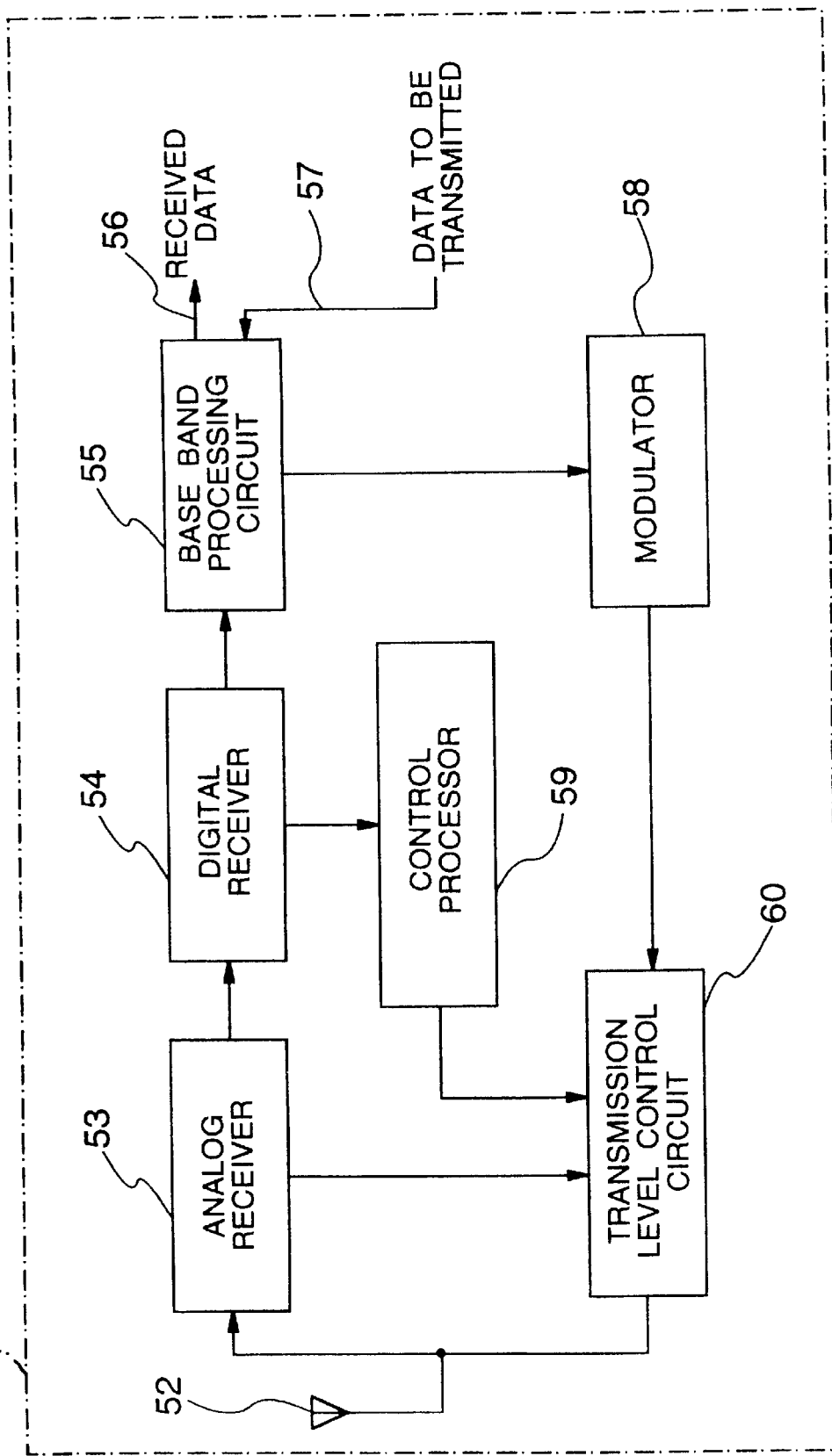
Figure 3A:
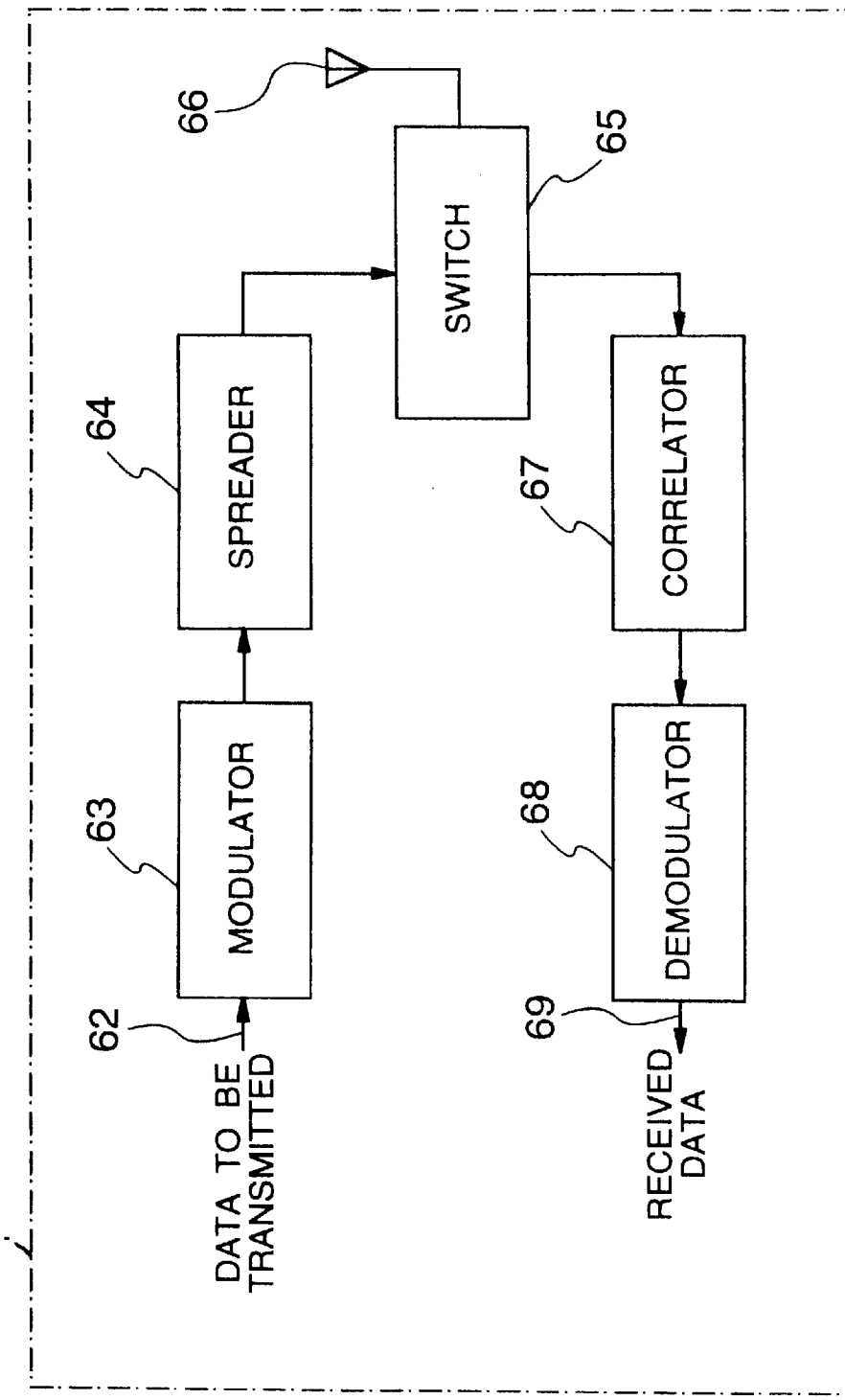
FIGS. 3A, 3B are block diagram showing a prior art mobile radio apparatus employing a TDD scheme.
Figure 3B:
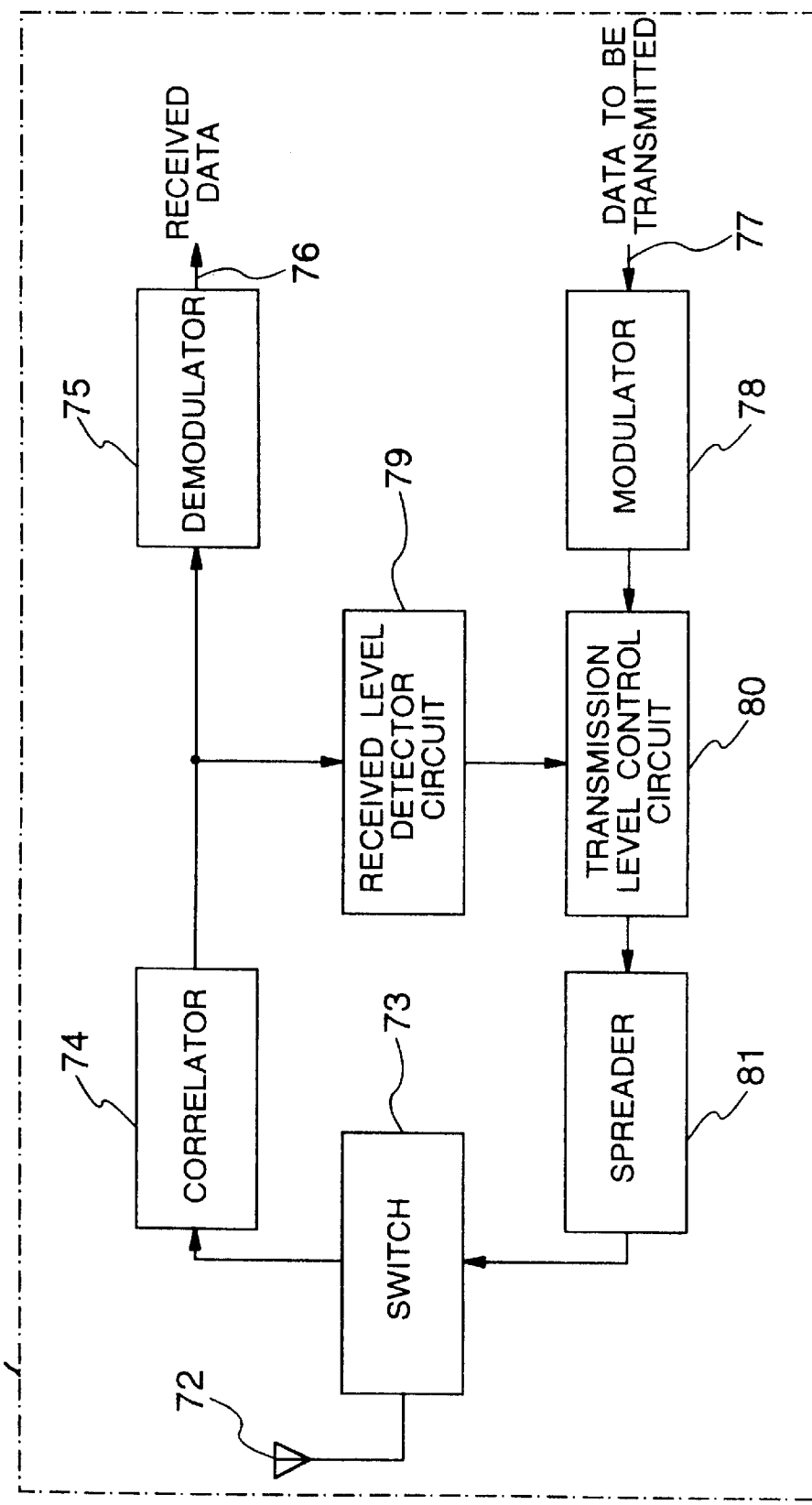
Figure 4:
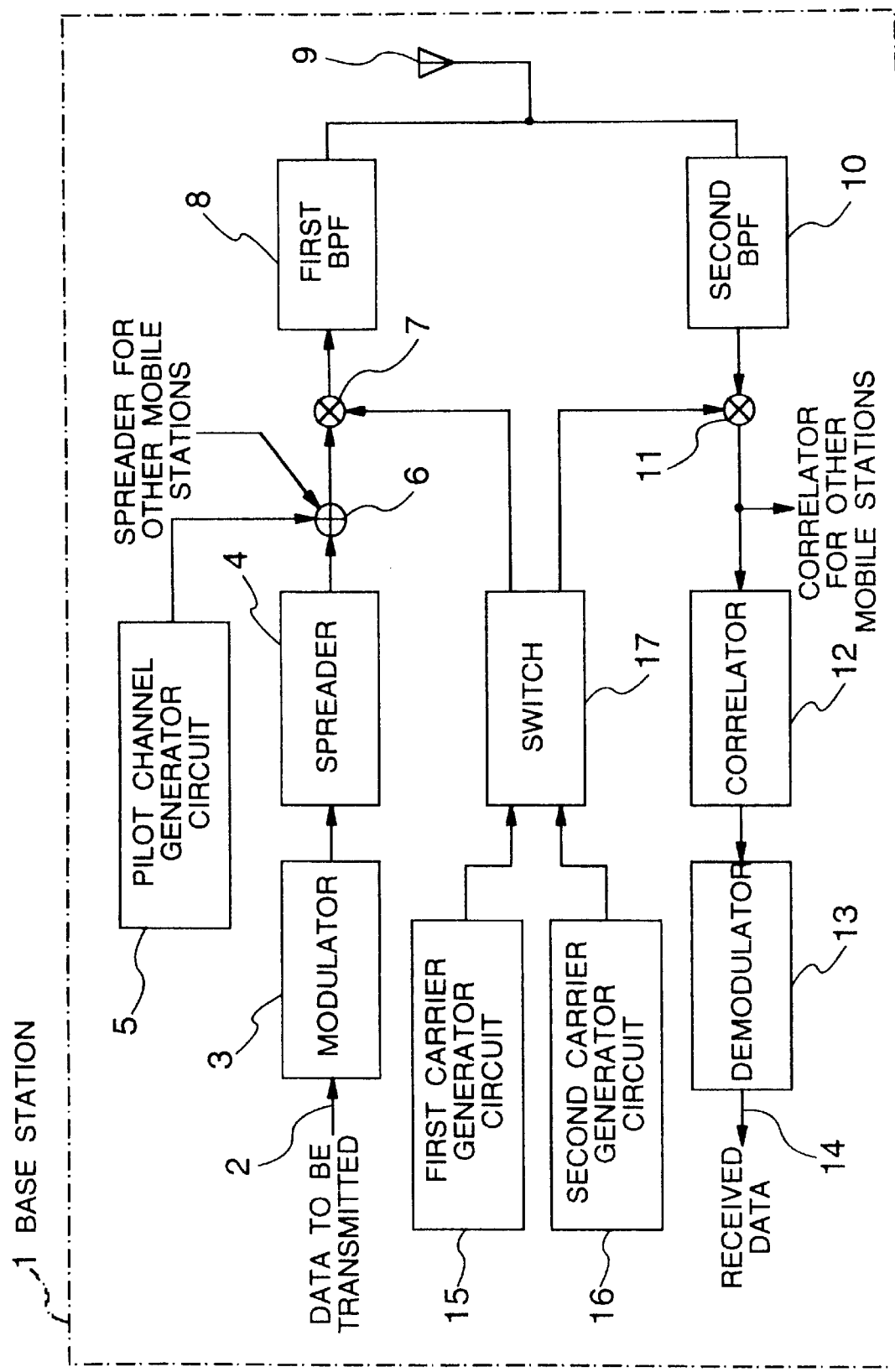
FIG. 4 is a block diagram showing a base station for explaining a first embodiment of a mobile radio apparatus according to the present invention.

In a first embodiment of a mobile radio apparatus according to the present invention, a base station 1 includes, as shown in FIG. 4, a modulator 3 for receiving data 2 transmitted from the base station 1; a spreader 4 coupled to receive an output signal of the modulator 3; a pilot channel generator circuit 5 for generating a pilot channel signal; an adder 6 for adding an output signal of the spreader 4, the pilot channel signal, and output signals of spreaders for other mobile stations; a first carrier generator circuit 15 for generating a first carrier at frequency $f_1$; a second carrier generator circuit 16 for generating a second carrier at frequency $f_2$; a switch 17 for selecting either the first carrier or the second carrier for outputting; a first multiplier 7 for multiplying an output signal of the adder 6 by an output signal of the switch 17; a first bandpass filter (BPF) 8 coupled to receive an output signal of the first multiplier 7; and an antenna 9 coupled to receive an output signal of the first bandpass filter 8. The base station 1 also includes a second bandpass filter (BPF) 10 coupled to receive a signal received by the antenna 9; a second multiplier 11 for multiplying an output signal of the second bandpass filter 11 by the output signal of the switch 17; a correlator 12 coupled to receive an output signal of the second multiplier 11; and a demodulator 13 for demodulating an output signal of the correlator 12 to output received data 14. The output signal of the second multiplier 11 is also inputted to correlators for other mobile stations.

Figure 5:
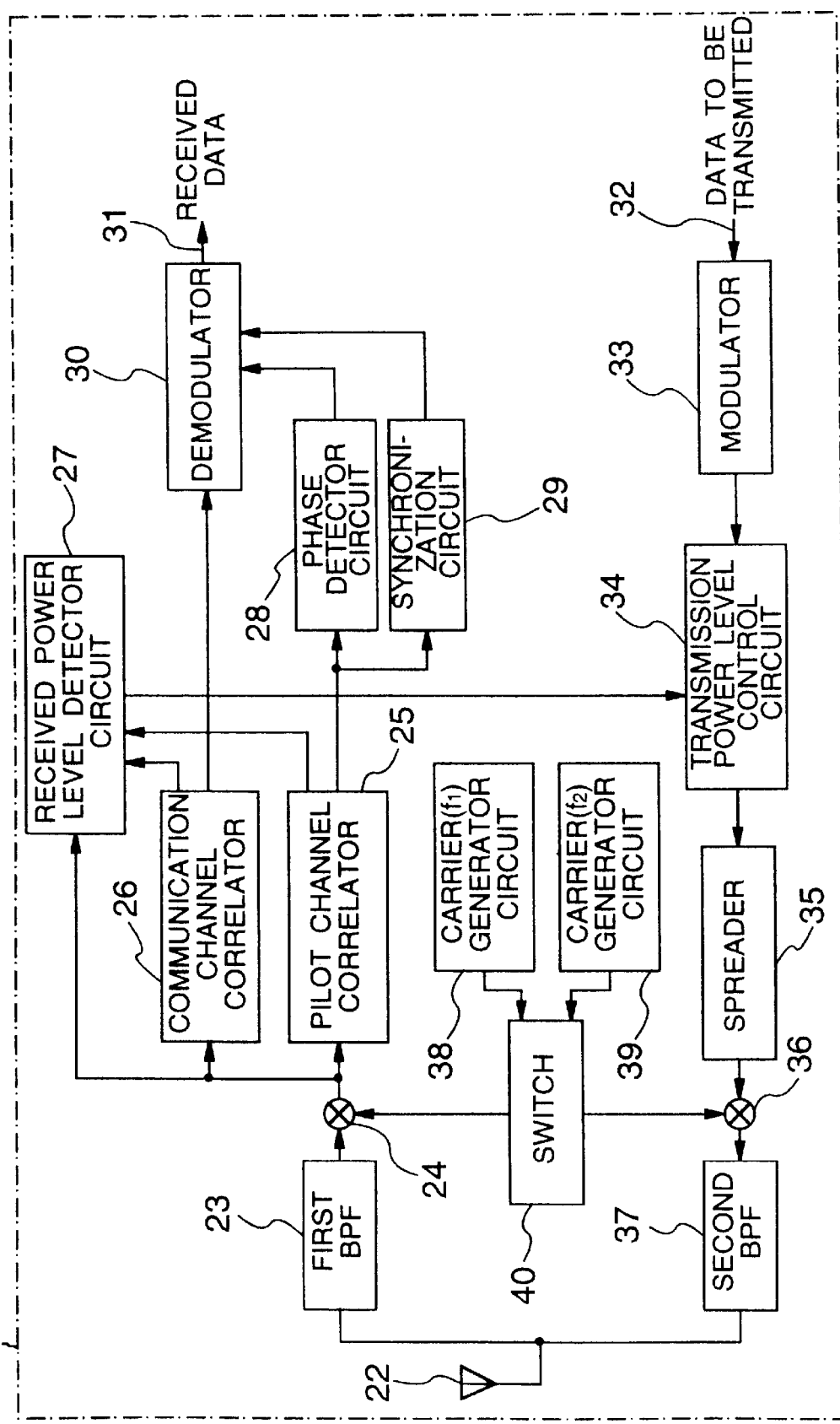
FIG. 5 is a block diagram showing a mobile station for explaining the first embodiment of the mobile radio apparatus according to the present invention.

In the first embodiment of the mobile radio apparatus according to the present invention, a mobile station 21 includes, as shown in FIG. 5, an antenna 22; a first bandpass filter (BPF) 23 coupled to receive a signal received by the antenna 22; a first carrier generator circuit 38 for generating a first carrier at frequency $f_1$; a second carrier generator circuit 39 for generating a second carrier at frequency $f_2$; a switch 40 for selecting either the first carrier or the second carrier for outputting; a first multiplier 24 for multiplying an output signal of the first bandpass filter 23 by an output signal of the switch 40; a pilot channel correlator 25 coupled to receive an output signal of the first multiplier 24; a communication channel correlator 26 also coupled to receive the output signal of the first multiplier 24; a received power level detector circuit 27 coupled to receive the output of the first multiplier 24, an output signal of the pilot channel correlator 25 and an output signal of the communication channel correlator 26; a phase detector 28 coupled to receive the output signal of the pilot channel correlator 25; a synchronization circuit 29 coupled to receive the output signal of the pilot channel correlator 25; and a demodulator 30 for demodulating received data 31 from the output signal of the communication channel correlator 26, an output signal of the phase detector circuit 28 and an output signal of the synchronization circuit 29. The mobile station 21 also includes a modulator 33 coupled to receive data 32 transmitted from the mobile station 21; a transmission power level control circuit 34 coupled to receive an output signal of the modulator 33 and an output signal of the received power level detector circuit 27; a spreader 35 coupled to receive an output signal of the transmission power level control circuit 34; a second multiplier 36 for multiplying an output signal of the spreader 35 by the output signal of the switch 40; and a second bandpass filter (BPF) 37 coupled to receive an output signal of the second multiplier 36. An output signal of the second bandpass filter 37 is delivered to the antenna 22. Generally, a plurality of mobile stations 21 communicates with a single base station 1.

The present embodiment employs the hybrid CDMA scheme as an access scheme, and selects a hopping pattern so as to avoid overlapping of a reverse link with a forward link at the same time, and moreover multiplexes them in the same frequency band. FIG. 6 represents the concept of the present embodiment which illustrates an example of hopping two frequency bands at frequency $f_1$ and at frequency $f_2$. Specifically explaining, at time $T_1$, the base station 1 starts transmission at frequency $f_1$ while a mobile station 21 starts transmission at frequency $f_2$. Then, at next time $T_2$, the transmitting frequency of the base station 1 is hopped to $f_2$, while the transmitting frequency of the mobile station 21 is hopped to $f_1$, and the transmission is continued. A duration for which the same frequency is used is called "one hop". The operations described above realize the communications using the same frequency band for the reverse link and the forward link. When a plurality of mobile stations 21 exist, a multiple access is performed between the mobile stations 21 and the base station 1 by the direct spreading using the same hopping pattern.

In the base station 1, data to be transmitted 2 to the mobile station 21 is modulated in the modulator 3 and spread by a previously allocated spreading code by the spreader 4. An output signal of the spreader 4 is multiplexed with output signals of spreaders for communicating with other mobile stations and a pilot channel signal outputted from the pilot channel generator 5 in the adder 6. The pilot channel signal is in synchronism with a communication channel signal and employs a fixed data pattern consisting of all "0" or all "1" which is spread by a particular spreading code and is given constant transmission power. The multiplexed signal is multiplied by a carrier in the first multiplier 7, passed through the first bandpass filter 8, and then transmitted to a transmission channel through the antenna 9. The carrier used by the multiplier 7 is one of the first carrier at frequency $f_1$ generated by the first carrier generator circuit 15 and the second carrier at frequency $f_2$ generated by the second carrier generator circuit 16 which are switched by the switch 17, such that the second carrier at frequency $f_2$ is selected at time $T_1$, and the first carrier at frequency $f_1$ is selected at time $T_2$, as shown in FIG. 6.

On the reception side of the base station 1, a received signal from the antenna 9 is passed through the second bandpass filter 10, and multiplied by a carrier in the multiplier 11 to frequency convert the received signal from the RF band to the baseband. Also at this time, one of the output signals from the first carrier generator circuit 15 and the second carrier generator circuit 16 is used, where, contrary to the transmission side, the first carrier at frequency $f_1$ is selected at time $T_1$, and the second carrier at frequency $f_2$ is switched at time $T_2$, as shown in FIG. 6. The output signal of the second multiplier 11 is inputted to the correlators for communicating with other mobile stations and is subjected to correlation detection in the correlator 12 for the particular mobile station 21 by the same spreading code as that used in the spreader 35 in the mobile station 21 to separate a communication channel signal of the mobile station 21 from a multiplexed signal including signals from a plurality of mobile stations. The separated signal is inputted to the demodulator 13 which demodulates the inputted signal to derive received data 14.

In the mobile station 21 shown in FIG. 5, an incoming signal from the base station 1 through a transmission channel is received by the antenna 22, passed through the first bandpass filter 23, and multiplied by a carrier in the first multiplier 24 to frequency convert the received signal from the RF band to the baseband. For the carrier, output signals from the first carrier generator circuit 38 and the second carrier generator circuit 39 are alternately used by manipulating the switch 40 such that the second carrier at frequency $f_2$ is selected at time $T_1$ and the first carrier at frequency $f_1$ is selected at time $T_2$, as shown in FIG. 6. An output signal of the first multiplier 24 is inputted to the pilot channel correlator 25, the communication channel correlator 26, and the received power level detector circuit 27.

The pilot channel correlator 25 performs the correlation detection by the spreading code used for the spreading of a pilot channel signal to separate the pilot channel signal which is inputted to the phase detector circuit 28, the synchronization circuit 29 and the received power level detector circuit 27. The phase detector circuit 28 detects a phase shift in the pilot channel signal possibly due to fading, offset of the frequency of the carrier used for transmission and reception, and so on, and inputs the detected phase shift to the demodulator 30. Since the pilot channel signal and the communication channel signal use the same carrier and are transmitted through the same transmission channel, a phase shift, if any, is thought to occur identically in these signals. Also, since the data pattern of the pilot channel signal is known, its absolute phase can be easily detected. The synchronization circuit 29 captures the synchronization of data timing in the pilot channel signal which is inputted to the demodulator 30.

The communication channel correlator 26 in the mobile station 21 separates a communication channel signal directed to the mobile station 21 itself by using correlation detection, and inputs the separated communication channel signal to the demodulator 30 and the received power level detector circuit 27. The demodulator 30 corrects the phase of the communication channel signal, if required, using the phase shift inputted from the phase detector circuit 28, and demodulates the same using the timing from the synchronization circuit 29 to derive received data 31.

The received power level detector circuit 27 detects the total power level of the received signal outputted from the first multiplier 24, the power level of the communication channel signal and the power level of the pilot channel signal, and inputs the detected three power levels to the transmission power level control circuit 34.

On the transmission side of the mobile station 21, data 32 to be transmitted to the base station 1 is modulated in the modulator 33, and the modulated data is inputted to the transmission power level control circuit 34. The transmission power level control circuit 34 controls the transmission power for the modulated data to be transmitted, using the respective received power levels inputted thereto, and outputs the modulated data with the controlled transmission power to the spreader 35. A transmission power level control method used herein will be described later. The spreader 35 spreads the modulated data with the controlled transmission power using an allocated spreading code. An output signal of the spreader 35 is multiplied by a carrier in the second multiplier 36. For the carrier, output signals from the first carrier generator circuit 38 and the second carrier generator circuit 39 are alternately used by manipulating the switch 40 such that the first carrier at frequency $f_1$ is selected at time $T_1$, and the second carrier at frequency $f_2$ is selected at time $T_2$, as shown in FIG. 6, i.e., contrary to the case of the reception. An output signal of the second multiplier 36 is passed through the second bandpass filter 37 and transmitted to a communication channel from the antenna 22.

It should be particularly noted that the transmission power control in the present embodiment is performed only in an open loop configuration. First, pay attention to the frequency $f_2$ in FIG. 6. At time $T_1$, the mobile station 21 is receiving at frequency $f_2$, and the average received power level of the pilot channel signal and the communication channel signal during one hop is detected by the received power level detector circuit 27. The transmission power level control circuit 34 compares the detected value with a predetermined received power level to know the link state at frequency $f_2$, and determines the transmission power so as to maintain the received power level at the base station 1 constant when the mobile station 21 starts transmission at time $T_2$ using the second carrier at frequency $f_2$. Although the transmission is started at time $T_2$ with the determined power level, the received power level detector circuit 27 is continuously detecting the total power level of a received signal outputted from the first multiplier 24, even when the transmission is in progress, to control the transmission power in response to changes in the received power level using the detected total power level of the received signal. It should be noted that the value detected by the received power level detector 27 is the power level of a signal transmitted using the first carrier at frequency $f_1$, so that a signal currently transmitted using the second carrier at frequency $f_2$ may suffer from different fading. Thus, in this case, the transmission level control is performed corresponding to sudden changes in received power level due to shadowing caused by a building or the like. By performing the foregoing processing on both the frequency bands at frequencies $f_1$, $f_2$, the present embodiment realizes the transmission power control only with an open loop configuration.

Further, by transmitting from the base station 1 the pilot channel signal having larger transmission power than that of the communication channel signal, it is possible to increase the accuracy of detecting the received power level of the pilot channel signal at the mobile station 21, as well as to facilitate the phase detection and synchronization capture, thus improving the demodulation performance.

Next, a second embodiment of the mobile radio apparatus according to the present invention will be described. In the second embodiment, the mobile station 21 of FIG. 5 performs prediction of the received power level and transmission power control with a method different from the first embodiment.

Figure 7A:
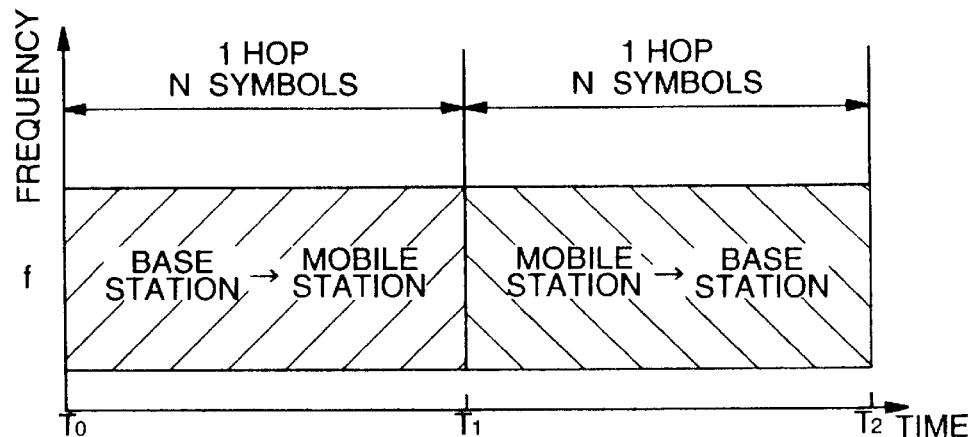
FIGS. 7A–7C are characteristic graphs representing the relationship between the power level and the time for a transmission power control method in a second embodiment of the mobile radio apparatus according to the present invention.
Figure 7B:
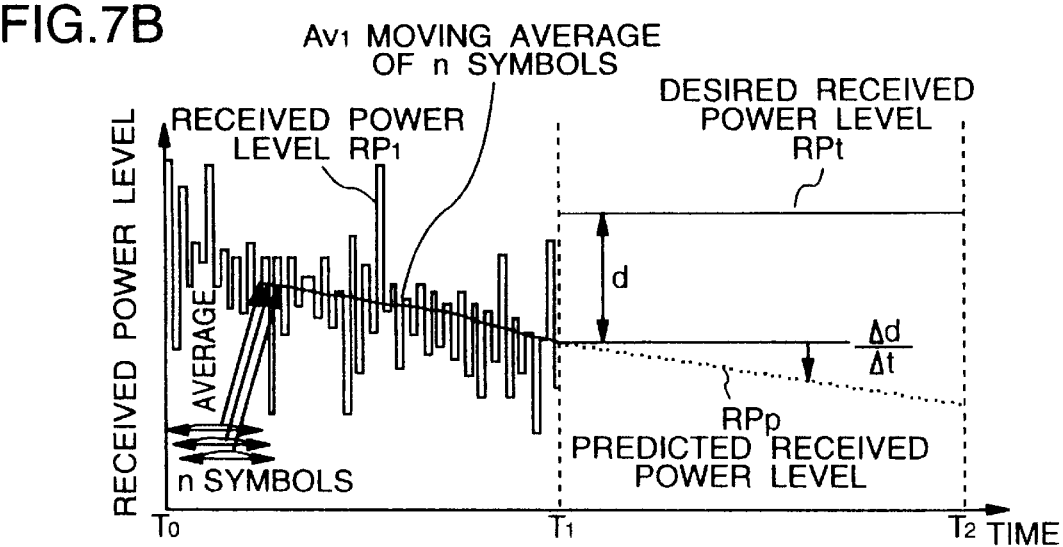
Figure 7C:
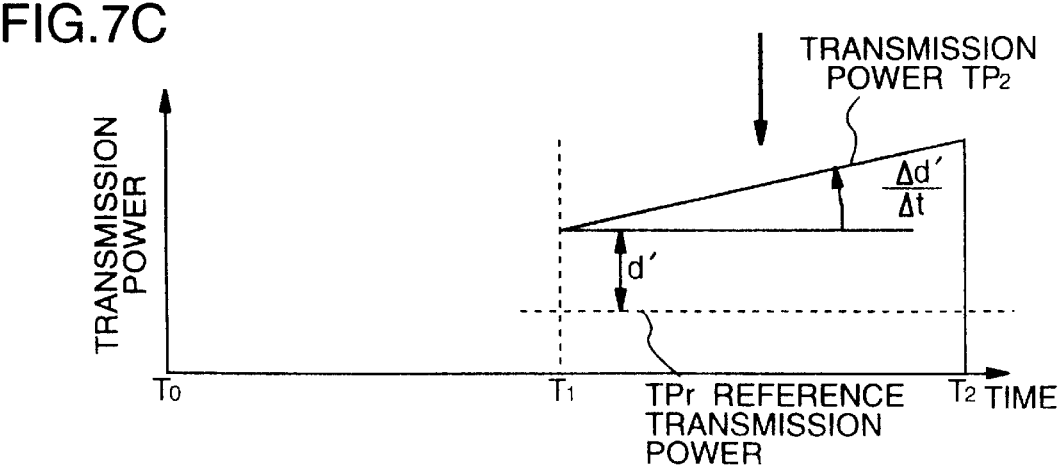

FIGS. 7A–7C represent the relationship between transmission and reception, paying special attention to a carrier frequency f in the hopping pattern shown in FIG. 6. The mobile station 21 performs reception at carrier frequency f from time $T_0$ to time $T_1$, and performs transmission from time $T_1$ to time $T_2$ at the same frequency f as the reception from time $T_0$ to time $T_1$. It is assumed in FIGS. 7A–7C that N symbols of data are transmitted or received per one hop.

A transmission power control method according to the second embodiment will be described below on the foregoing assumption. The mobile station 21 previously sets a desired received power level $RP_r$ during reception, and a reference transmission power $TP_r$ as an optimal transmission power level in a radio link state in which the mobile station 21 is receiving at the desired received power level $RP_r$.

During a period $T_0$–$T_1$, the mobile station 21 detects the received power level $RP_1$ of each symbol and calculates a moving average $A_{V1}$ of the received power level for n symbols. By thus calculating the moving average $A_{V1}$, the influence of noise can be removed from the detection of the received power level. Next, a predicted received power level $RP_p$ during a period $T_1$–$T_2$ is calculated from the moving average $A_{V1}$ and used to determine transmission power $TP_2$ during the period $T_1$–$T_2$. The predicted received power level $RP_p$ at time $T_1$ is used as the last value of the moving averages $A_{V1}$ of every n symbols during the period $T_0$–$T_1$. A changing amount is assumed to be the changing amount of the moving average $A_{V1}$. The transmission power level is determined in the following manner. If the predicted received power level $RP_p$ at time $T_1$ is lower than the desired received power level $RP_r$, and the changing amount is $\Delta d/\Delta t$, an initial value of the transmission power $TP_2$ during the period $T_1$–$T_2$ is made larger than the reference transmission power $TP_r$ by d' and the changing amount of the transmission power is set to $\Delta d'/\Delta t$. By thus controlling the transmission power, the received power level at the base station 1 can be maintained at an optimal value to enable highly accurate transmission power control, as long as the link situation does not largely change during the period $T_1$–$T_2$.

Next, a third embodiment of the mobile radio apparatus according to the third embodiment will be described. In the third embodiment, the method of predicting the received power level utilized in the second embodiment is modified in consideration of a changing pattern of an actually received power level due to fading.

Figure 8:
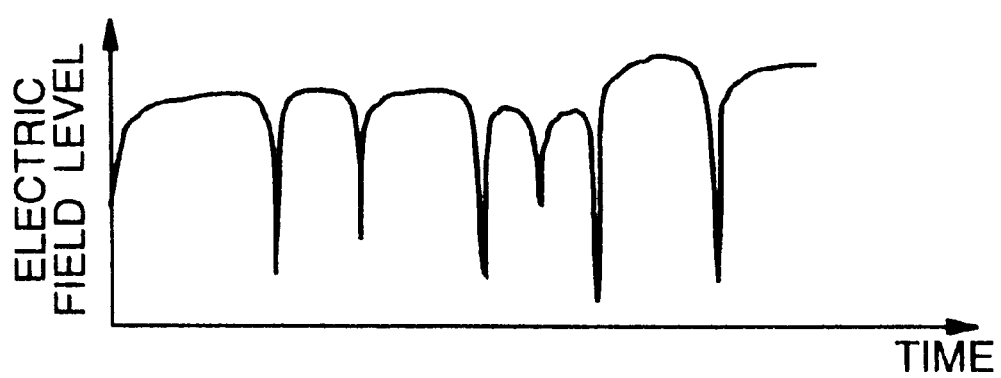
FIG. 8 is a characteristic graph illustrating an actually received power level for explaining a third embodiment of the mobile radio apparatus according to the present invention.

The instantaneous value of an actually received electric field suffering from fading tends to exhibit sudden drops from a slowly decreasing state and sudden increases, as shown in FIG. 8. Therefore, if the changing amount of the received power level of the moving average of n symbols is decreasing, the received power level must be predicted in consideration of the above-mentioned tendency.

Figure 9A:
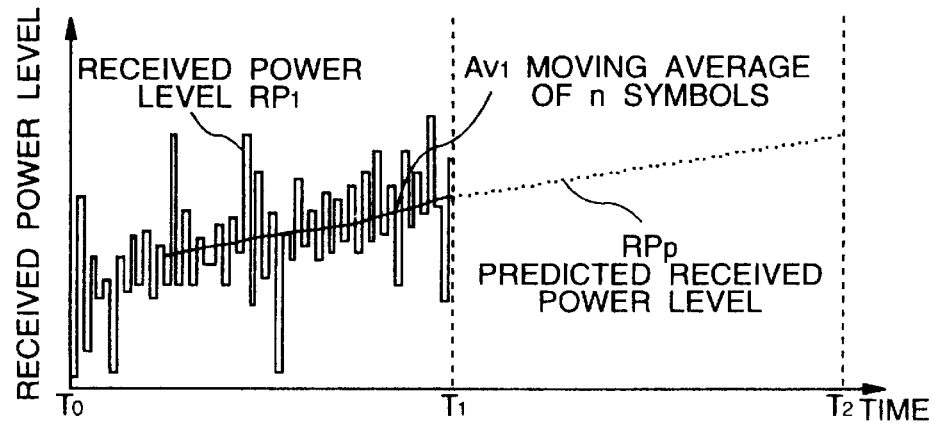
FIGS. 9A–9D are characteristic graphs representing the relationship between the power level and the time for a transmission power control method in a third embodiment of the mobile radio apparatus according to the present invention.
Figure 9B:
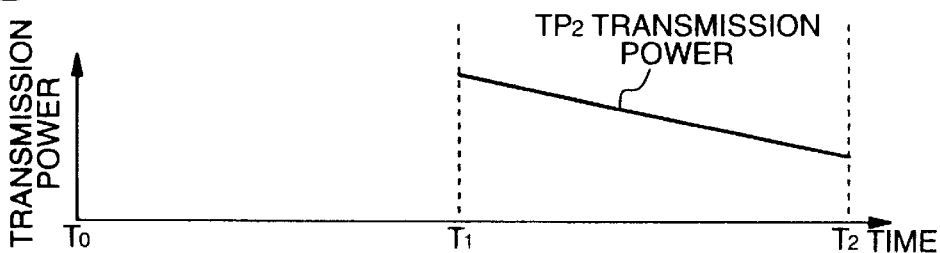
Figure 9C:
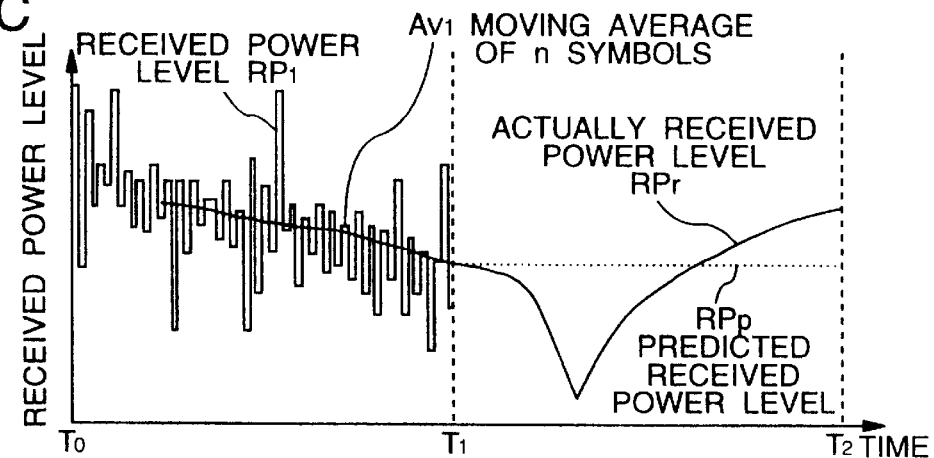
Figure 9D:
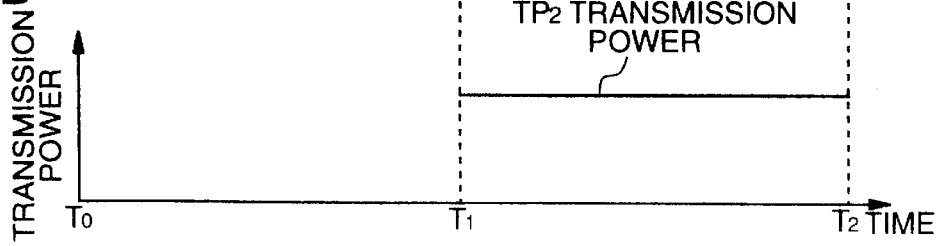

In the third embodiment, as shown in FIGS. 9A, 9B, when the moving average AV1 of the received power level $RP_1$ is increasing during the period $T_0$–$T_1$, a predicted received power level $RP_p$ is calculated for the period $T_1$–$T_2$ similarly to the aforementioned second embodiment to determine the transmission power $TP_2$. On the contrary, when the moving average $A_{V1}$ of the received power level $RP_1$ is decreasing during the period $T_0$–$T_1$, as shown in FIGS. 9C, 9D, the predicted received power level $RP_p$ calculated for the period $T_1$–$T_2$ is assigned as the last value of the moving averages $A_{V1}$ of every n symbols during the period $T_0$–$T_1$, and used to determine the transmission power $TP_2$, predicting that a temporally not-changing level will follow, even if the actually received power level $RP_r$ largely fluctuates.

As described above, by predicting the received power level to control the transmission power, highly accurate control for the transmission power can be accomplished without erroneous prediction.

As is apparent from the description of the respective embodiments, in the radio mobile apparatus employing, as a multiple access scheme, a hybrid CDMA scheme which is a combination of direct spreading and frequency hopping, a hopping pattern is selected for the forward link from a base station to a mobile station and the reverse link from the mobile station to the base station so as to avoid overlapping of these signals at the same time, in order to multiplex a signal on the forward link and a signal on the reverse link in the same frequency band, so that the mobile station can immediately know a radio link state from the power of received signal from the base station. Thus, the present invention can provide a mobile radio apparatus which can highly accurately perform high speed transmission power control in units of hops.

Also, the use of the pilot channel signal permits the mobile station to know the radio link state independently of changes in the transmission power of a signal from the base station on a communication channel, so that further accurate control can be achieved for the transmission power by avoiding different accuracies presented by the respective mobile stations in the detection of the received power level due to different spreading codes and different communication channel data employed by the respective mobile stations.

What is claimed is:

1. A mobile radio apparatus comprising a base station and a mobile station, each of which comprises communication means according to a hybrid code division multiple access scheme, including a combination of a direct sequence method and a frequency hopping method as a multiple access scheme, wherein:

each of said base station and said mobile station comprises means for transmitting and receiving simultaneously, and means for multiplexing a reverse link signal transmitted from said mobile station to said base station and a forward link signal transmitted from said base station to said mobile station within a same frequency band after selecting a hopping pattern so as to completely avoid overlapping said reverse link signal with said forward link signal at the same time; and said mobile station further comprises:
   means for detecting received power levels at all of a plurality of hopping frequencies of a communication channel after correlation detection; and
   means for controlling a transmission power of a transmission signal at a hopping frequency using the received power level detected at the same hopping frequency.

2. A mobile radio apparatus according to claim 1, wherein said means for detecting received power levels in said mobile station detects a received power level of said communication channel after correlation detection and a received power level of a received signal before said correlation detection; and said means for controlling a transmission power performs a transmission power control using both of said received power levels, and performs said transmission power control for said received power level of said received signal before correlation detection immediately after said received power level of said received signal before correlation detection is detected.

3. A mobile radio apparatus comprising a base station and a mobile station, each of which comprises communication means according to a hybrid code division multiple access scheme, including a combination of a direct sequence method and a frequency hopping method as a multiple access scheme, wherein:

each of said base station and said mobile station comprises means for multiplexing a reverse link signal transmitted from said mobile station to said base station and a forward link signal transmitted from said base station to said mobile station within a same frequency band after selecting a hopping pattern so as to completely avoid overlapping said reverse link signal with said forward link signal at the same time; and said mobile station further comprises:

first means for detecting received power levels at all of a plurality of hopping frequencies of a communication channel both before correlation detection and after correlation detection, said first means detecting a received power level of each of a plurality of symbols in one hop, one hop being a period during which the frequency band remains unchanged; and second means for controlling a transmission power of a transmission signal at a hopping frequency using both of the received power levels detected at the same hopping frequency, said first means performing said transmission power control for said received power level of said received signal before correlation detection immediately after said received power level of said received signal before correlation detection is detected, and said second means performing said transmission power control based on a received power level and a changing amount thereof which are obtained from a moving average of said received power level in a constant symbol.

4. A mobile radio apparatus according to claim 3, wherein said means for controlling a transmission power in said mobile station decreases said transmission power level in a transmission power control as the time passes when a changing amount of said received power increases, and maintains said transmission power level constant when said changing amount decreases.

5. A mobile radio apparatus comprising a base station and a mobile station, each of which comprises communication means according to a hybride code division multiple access scheme, including a combination of a direct sequence method and a frequency hopping method as a multiple access scheme, wherein:

each of said base station and said mobile station comprises means for multiplexing a reverse link signal transmitted from said mobile station to said base station and a forward link signal transmitted from said base station to said mobile station within a same frequency band after selecting a hopping pattern so as to completely avoid overlapping said reverse link signal with said forward link signal at the same time; and said mobile station further comprises:

first means for detecting received power levels at all of a plurality of hopping frequencies of a communication channel after correlation detection, said first means detecting a received power level of each of a plurality symbols in one hop, one hop being a period during which the hopping frequency remains unchanged; and second means for controlling a transmission power of a transmission signal at a hopping frequency using the received power level detected at the same hopping frequency, said second means performing a transmission power control based on a received power level and a changing amount thereof which are obtained from a moving average of said received power level in a constant symbol.

6. A mobile radio apparatus according to claim 5, wherein said second means in said mobile station decreases said transmission power level in a transmission power control as the time passes when a changing amount of said received power increases, and maintains said transmission power level constant when said changing amount decreases.

7. A mobile radio apparatus comprising a base station and a mobile station, each of which comprises communication means according to a hybrid code division multiple access scheme, including a combination of a direct sequence method and a frequency hopping method as a multiple access scheme, wherein:

each of said base station and said mobile station comprises means for multiplexing a reverse link signal transmitted from said mobile station to said base station and a forward link signal transmitted from said base station to said mobile station within a same frequency band after selecting a hopping pattern so as to completely avoid overlapping said reverse link signal with said forward link signal at the same time, and further comprises a communication channel for performing communication in a forward link and a pilot channel which is common for all of a plurality of mobile stations and a transmission power of which is fixed by fixing a data pattern or by employing a data pattern consisting of all "0" or all "1";

said base station comprises means for transmitting said pilot channel after multiplexing said pilot channel in said reverse link; and said mobile station comprises:

means for performing correlation detection of said pilot channel;

means for detecting received power levels at all of a plurality of hopping frequencies of said pilot channel after said correlation detection; and means for controlling a transmission power of a transmission signal at a hopping frequency using the received power level detected at the same hopping frequency.

8. A mobile radio apparatus according to claim 7, wherein said means for detecting received power levels in said mobile station detects a received power level of said pilot channel after said correlation detection and a received power level of said communication channel after said correlation detection; and said means for controlling a transmission power performs a transmission power control using both of said received power levels.

9. A mobile radio apparatus according to claim 8, wherein said mobile station comprises means for capturing and holding synchronization by using said pilot channel, and performs data demodulation of a data channel using said synchronization.

10. A mobile radio apparatus according to claim 9, wherein said mobile station comprises means for detecting a phase of a received signal using said pilot channel, and performs data demodulation of a data channel using said phase.

11. A mobile radio apparatus according to claim 8, wherein said mobile station comprises means for detecting a phase of a received signal using said pilot channel, and performs data demodulation of a data channel using said phase.

12. A mobile radio apparatus according to claim 7, wherein said means for detecting received power levels in said mobile station detects a received power level of said pilot channel after said correlation detection and a received power level of a received signal before said correlation detection; and said means for controlling a transmission power level performs a transmission power control using both of said received power levels, and performs said transmission power control for said received power level of said received signal before said correlation detection immediately after said received power level of said received signal before said correlation detection is detected.

13. A mobile radio apparatus according to claim 12, wherein said mobile station comprises means for capturing and holding synchronization using said pilot channel, and performs data demodulation of a data channel using said synchronization.

14. A mobile radio apparatus according to claim 13, wherein said mobile station comprises means for detecting a phase of a received signal using said pilot channel, and performs data demodulation of a data channel using said phase.

15. A mobile radio apparatus according to claim 12, wherein said mobile station comprises means for detecting a phase of a received signal using said pilot channel, and performs data demodulation of a data channel using said phase.

16. A mobile radio apparatus according to claim 7, wherein said means for detecting received power levels in said mobile station detects a received power level of said pilot channel after said correlation detection, a received power level of said communication channel after said correlation detection, and a received power level of a received signal before said correlation detection; and said means for controlling a transmission power performs a transmission power control using both of said received power levels, and performs said transmission power control for said received power level of said received signal before said correlation detection immediately after said received power level of said received signal before said correlation detection is detected.

17. A mobile radio apparatus according to claim 16, wherein said mobile station comprises means for capturing and holding synchronization using said pilot channel, and performs data demodulation of a data channel using said synchronization.

18. A mobile radio apparatus according to claim 17, wherein said mobile station comprises means for detecting a phase of a received signal using said pilot channel, and performs data demodulation of a data channel using said phase.

19. A mobile radio apparatus according to claim 16, wherein said mobile station comprises means for detecting a phase of a received signal using said pilot channel, and performs data demodulation of a data channel using said phase.

20. A mobile radio apparatus according to claim 7, wherein said mobile station comprises means for capturing and holding synchronization using said pilot channel, and performs data demodulation of a data channel using said synchronization.

21. A mobile radio apparatus according to claim 20, wherein said mobile station comprises means for detecting a phase of a received signal using said pilot channel, and performs data demodulation of a data channel using said phase.

22. A mobile radio apparatus according to claim 7, wherein said mobile station comprises means for detecting a phase of a received signal using said pilot channel, and performs data demodulation of a data channel using said phase.

23. A mobile station for communicating with a base station, comprising:

means for receiving spread-spectrum transmissions from the base station via a forward link that hops between a plurality of frequency bands, the transmissions having a received power level at the mobile station;

means for determining the received power level of the transmissions from the base station in each of the frequency bands; and means for sending spread-spectrum transmissions to the base station over a reverse link that hops between the plurality of frequency bands, the means for sending including means for setting a transmission power level for transmitting on each of the frequency bands in accordance with the received power level determined for that frequency band.

24. A mobile station according to claim 23, wherein the means for receiving receives transmissions from the base station on one of the frequency bands while the means for sending transmits to the base station on another of the frequency bands.

25. A mobile station according to claim 23, wherein the plurality of frequency bands comprises a first frequency band and a second frequency band, the means for receiving and the means for transmitting both hopping back and forth between the first and second frequency bands, with the means for sending transmitting on the first frequency band when the means for receiving receives on the second frequency band and transmitting on the second frequency band when the means for receiving receives on the first frequency band.

26. A mobile station according to claim 23, wherein the means for receiving comprises means for conducting correlation detection using a spreading code.

27. A mobile station according to claim 26, wherein the means for transmitting comprises a spreader which uses the spreading code.

28. A mobile station according to claim 23, wherein the means for determining comprises means for finding a moving average of the received power level during a hop.

29. A mobile station according to claim 28, wherein the means for determining further comprises means for predicting the received power level during a subsequent hop on the basis of the moving average.

* * * * *